United States Patent
Lee et al.

(10) Patent No.: US 8,135,345 B2
(45) Date of Patent: Mar. 13, 2012

(54) METHOD AND APPARATUS FOR IDENTIFYING JAVA PUSH REQUEST EQUIPMENTS USING BLUETOOTH IN A MOBILE COMMUNICATION TERMINAL

(75) Inventors: Sung-Chan Lee, Yongin-si (KR); Jae-Min Lee, Seoul (KR); Hyun-Su Kim, Suwon-si (KR); Young-Soo Yun, Seoul (KR); Soo-Hyeon Lee, Suwon-si (KR); Ji-Hyun Kim, Icheon (KR)

(73) Assignee: Samsung Electronics Co., Ltd (KR)

( * ) Notice: Subject to any disclaimer, the term of this patent is extended or adjusted under 35 U.S.C. 154(b) by 610 days.

(21) Appl. No.: 12/276,789

(22) Filed: Nov. 24, 2008

(65) Prior Publication Data

US 2009/0143011 A1    Jun. 4, 2009

(30) Foreign Application Priority Data

Nov. 23, 2007    (KR) .................. 10-2007-0120048

(51) Int. Cl.
*H04B 7/00*    (2006.01)
(52) U.S. Cl. ...................... 455/41.2; 717/178
(58) Field of Classification Search ............... 455/41.2; 717/178
See application file for complete search history.

(56) References Cited

U.S. PATENT DOCUMENTS

| 7,274,909 B2 * | 9/2007 | Perttila et al. ............. 455/41.2 |
| 2005/0009469 A1 * | 1/2005 | Kotola ....................... 455/41.2 |
| 2007/0220498 A1 | 9/2007 | Madsen |

FOREIGN PATENT DOCUMENTS

| EP | 1 494 423 | 1/2005 |
| KR | 1020020037800 | 5/2002 |

OTHER PUBLICATIONS

"Logical Link Control and Adaption Protocol Specification" Bluetooth Specification Version, pp. 249-258, XP002137403, Nov. 29, 1999.

* cited by examiner

*Primary Examiner* — Joseph Chang
(74) *Attorney, Agent, or Firm* — The Farrell Law Firm, P.C.

(57) ABSTRACT

Provided are an identifying method and an apparatus for identifying a plurality of JAVA™ PUSH request terminals using Bluetooth® communication in a mobile communication terminal. According to the method, acquiring information records for performing JAVA™ PUSH about a plurality of terminals by requesting a service search through a Logical Link Control and Adaption Protocol (L2CAP) connection between the mobile communication terminal and the plurality of JAVA™ PUSH request terminals and displaying unique identification information of the plurality of JAVA™ PUSH request terminals by checking the information records of the plurality of JAVA™ PUSH request terminals.

26 Claims, 5 Drawing Sheets

METHOD AND APPARATUS FOR IDENTIFYING JAVA PUSH REQUEST EQUIPMENTS USING BLUETOOTH IN A MOBILE COMMUNICATION TERMINAL

PRIORITY

This application claims priority under 35 U.S.C. §119 to an application filed in the Korean Intellectual Property Office on Nov. 23, 2007 and assigned Serial No. 10-2007-0120048, the contents of which are incorporated herein by reference.

BACKGROUND OF THE INVENTION

1. Field of the Invention

The present invention relates generally to Bluetooth® communication, and more particularly, to a method and an apparatus for identifying JAVA™ PUSH request terminals in a mobile communication terminal.

2. Description of the Related Art

Modern mobile communication terminals provide various supplementary services beyond just voice communication and the Short Message Service (SMS).

For example, some supplementary service functions that are being implemented in mobile terminals are billing, remote controller, game, calculator, memo writing, management of phone book, message writing, chatting, transmission of still image and planning functions. Additional supplementary services are being developed and will soon be implemented.

The mobile communication terminal uses a JAVA™ program as an operating system. The JAVA™ program was developed in 1991 by SUN MICROSYSTEMS® in the U.S.A. and is an object oriented programming language that is independent of such operating systems as UNIX® and Windows®.

The mobile communication terminal using the JAVA™ program may download the JAVA™ program from a server or other mobile communication terminals and may execute the JAVA™ program, even if the mobile communication terminal does not have the JAVA® program, by using JAVA™ PUSH. In this case, the mobile communication terminal communicates with a peer terminal by using Bluetooth® or Infra-red data (IrDA). Herein, the term "java" refers to the JAVA™programming language, and the term "java push" refers to a push operation in accordance with the JAVA™ programming language.

However, the function of JAVA™ PUSH using Bluetooth® or IrDA may not respond to multiple JAVA™ PUSH requests.

For example, a slave terminal that receives the JAVA™ PUSH may not identify which mobile communication terminal requests the JAVA™ PUSH when multiple master mobile communication terminals request JAVA™ PUSH.

Accordingly, there is a need for a method and an apparatus for identification of master terminals requesting JAVA™ PUSH.

SUMMARY OF THE INVENTION

An object of the present invention is to provide method and apparatus for identifying JAVA™ PUSH request terminals identification using Bluetooth® in a mobile communication terminal According to the present invention, an identifying method for a plurality of JAVA™ PUSH request terminals using Bluetooth® communication in a mobile communication terminal includes acquiring information records, for performing JAVA™ PUSH, about a plurality of terminals by requesting a service search through a Logical Link Control and Adaption Protocol (L2CAP) connection between the mobile communication terminal and the plurality of JAVA™ PUSH request terminals and displaying unique identification information of the plurality of JAVA™ PUSH request terminals by checking the information records of the plurality of JAVA™ PUSH request terminals.

According to the present invention, an identifying method for a plurality of JAVA™ PUSH request terminals using Bluetooth® communication in a mobile communication terminal includes acquiring a service record of a slave terminal by requesting a service search for JAVA™ PUSH request and initiating an L2CAP connection by checking the service record.

According to the present invention, an identifying apparatus for a plurality of JAVA™ PUSH request terminals using Bluetooth® communication in a mobile communication terminal includes a service record controller for acquiring information records about a plurality of terminals for performing JAVA™ PUSH by requesting a service search through an L2CAP connection between the mobile communication terminal and the plurality of JAVA™ PUSH request terminals and a pop up displaying unit for displaying unique identification information of the plurality of JAVA™ PUSH request terminals by checking the information records of the plurality of JAVA™ PUSH request terminals.

According to the present invention, an identifying apparatus for a plurality of JAVA™ PUSH request terminals using Bluetooth® communication in a mobile communication terminal includes a service record controller for acquiring a service record of a slave terminal by requesting a service search for JAVA™ PUSH request and a Bluetooth®connection unit for initiating an L2CAP connection by checking the service record.

BRIEF DESCRIPTION OF THE DRAWINGS

The above and other objects, features, and advantages of the present invention will become more apparent from the following detailed description, when taken in conjunction with the accompanying drawings, in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness.

Hereinafter, a method and an apparatus for identifying JAVA™ PUSH request terminals in a mobile communication terminal will be described in detail.

Figure 1:
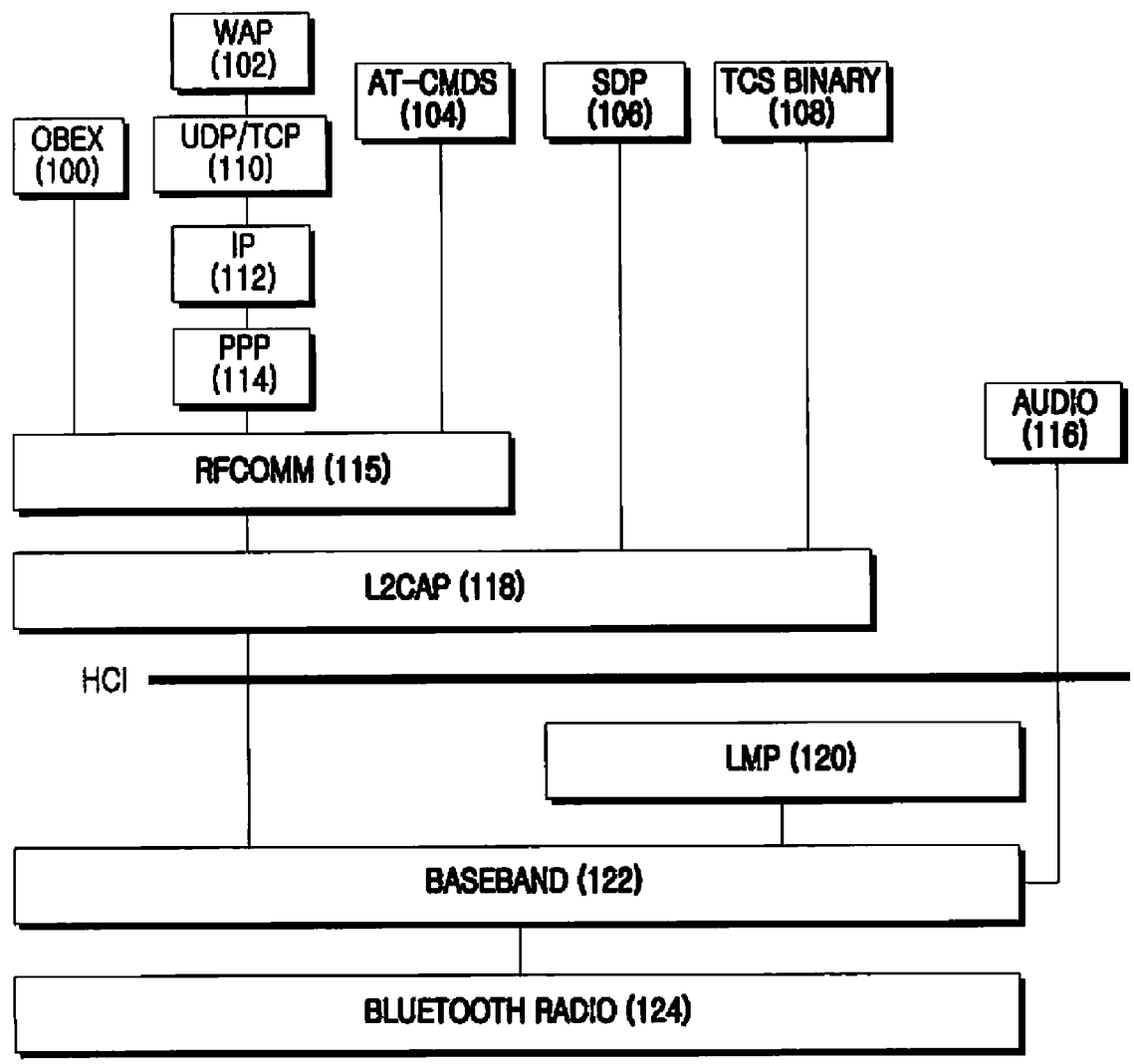
FIG. 1 illustrates a Bluetooth® protocol stack.

FIG. 1 illustrates a Bluetooth® protocol stack.

Referring to FIG. 1, a Bluetooth® protocol stack may be categorized into a Host Controller Interface (HCI), lower layer protocols based on the HCI and upper layer protocols based on the HCI. The lower layer protocols include a baseband 122 and a Link Manager Protocol (LMP) 120.

The upper layer protocols include a Logical Link Control and Adaptation Protocol (L2CAP) 118, a Radio Frequency COMMunication (RFCOMM) 115, a Service Discovery Protocol (SDP) 106, a Telephony Control protocol Specification binary (TCS binary) 108 and a OBject EXchange Profile (OBEX) 100.

The lower layer protocols are generally included in a host controller or a Bluetooth chip and are implemented as type of a hardware or a firmware.

The baseband 122 is connected to a Bluetooth® Radio 124 and configures and manages a link and a pico network. Also, the baseband 122 provides a reliable link to the upper layer protocols by using a Forward Error Correction (FEC) or an Automatic Repeat reQuest (ARQ). The baseband 122 performs algorithms for authentication and encryption.

A LMP 120 is a protocol for link setup, management and security. The upper layer protocols are implemented as software in a host and may be flexibly implemented according to an application and the host.

A L2CAP 118 is a type of link layer protocol and provides a logical channel to the upper layer such as the TCS 106, the RFCOMM 115 and the SDP 106. Also, the L2CAP 118 performs Segmentation And Reassembly (SAR) for the appropriate length of a baseband packet.

The JAVA™ PUSH in the present invention executes the application using the L2CAP service record. Most protocol stacks used in Bluetooth® are located above the L2CAP 118.

Therefore, the present invention includes a remote device address with the L2CAP service record so as to simultaneously respond to multiple push requests.

The present invention rejects a JAVA™ PUSH request for an unwanted mobile communication terminal or grants a JAVA™ PUSH request for a wanted mobile communication terminal. The SDP 106 is a protocol for the exchange of service information for a connection between terminals.

The RFCOMM 115 is a protocol for emulating a serial port and is a basic protocol for making RS-232 protocol wirelessly operable. The TCS 106 is a protocol related to the telephone and is used for the implementation of wireless telephone and inter-com using Bluetooth®.

The upper layer protocol such as User Datagram Protocol/Transmission Control Protocol (UDP/TCP) 110, Internet Protocol (IP) 112 and Point-to-Point Protocol (PPP) 114 is supported through the RFCOMM 115 above the L2CAP 118.

The OBEX 100 is a session protocol written in binary Hyper Text Transfer Protocol (HTTP) and is suitable for an ad-hoc wireless link and is used to exchange objects such as files and pictures. AT-CMDS (AT CoMmanDS) 104 is a set of commands for the mobile communication terminal or modem according to the various usages.

The lower layer protocols are embedded in the Bluetooth® host controller, or Bluetooth® chipset, and the upper layer protocols are implemented in the host.

Therefore, an interface is needed for communication between the lower and upper layer protocols, the interfacing being performed by the HCI.

The HCI is a standard interface between the host and the host controller (Bluetooth® module), which are connected with a link such as Universal Asynchronous Receiver/Transmitter (UART), Universal Serial Bus (USB) and Personal Computer Memory Card International Association (PCMCIA).

An HCI packet is exchanged through the link. The HCI is a standard interface made in Bluetooth® Special Interest Group (SIG). Therefore, The HCI is compatible with all Bluetooth® modules, regardless of the vendor.

Also, developers related to the applications and the upper layer protocols may easily access the lower layer protocols such as the baseband and the link manager through the HCI without having a thorough understanding of characteristics of the hardware or of the inner structures of the hardware particular to the vendor.

Therefore, this compatibility reduces difficulty of development and the developers can develop applications and the upper layer protocols compatible to the various hardware.

The host is connected to the Bluetooth® module, or the host controller, and controls the Bluetooth® D module and executes applications according to the system.

Generally, personal computers, Personal Digital Assistants (PDAs) and mobile communication terminals may be the host and the microprocessor may be the host for the embedded system.

The protocols included in the host are the HCI, the upper layer protocols such as L2CAP 118, RFCOMM 115, SDP 106, TCS108 and OBEX 100 above the HCI.

All the upper layer protocols are not always included. The upper layer protocols to be included are different according to the application and the profile.

As previously stated, the mobile communication terminal which receives the JAVA™ PUSH request is called a slave terminal, and the mobile communication terminal which requests the JAVA™ PUSH is called a master terminal.

Figure 2:
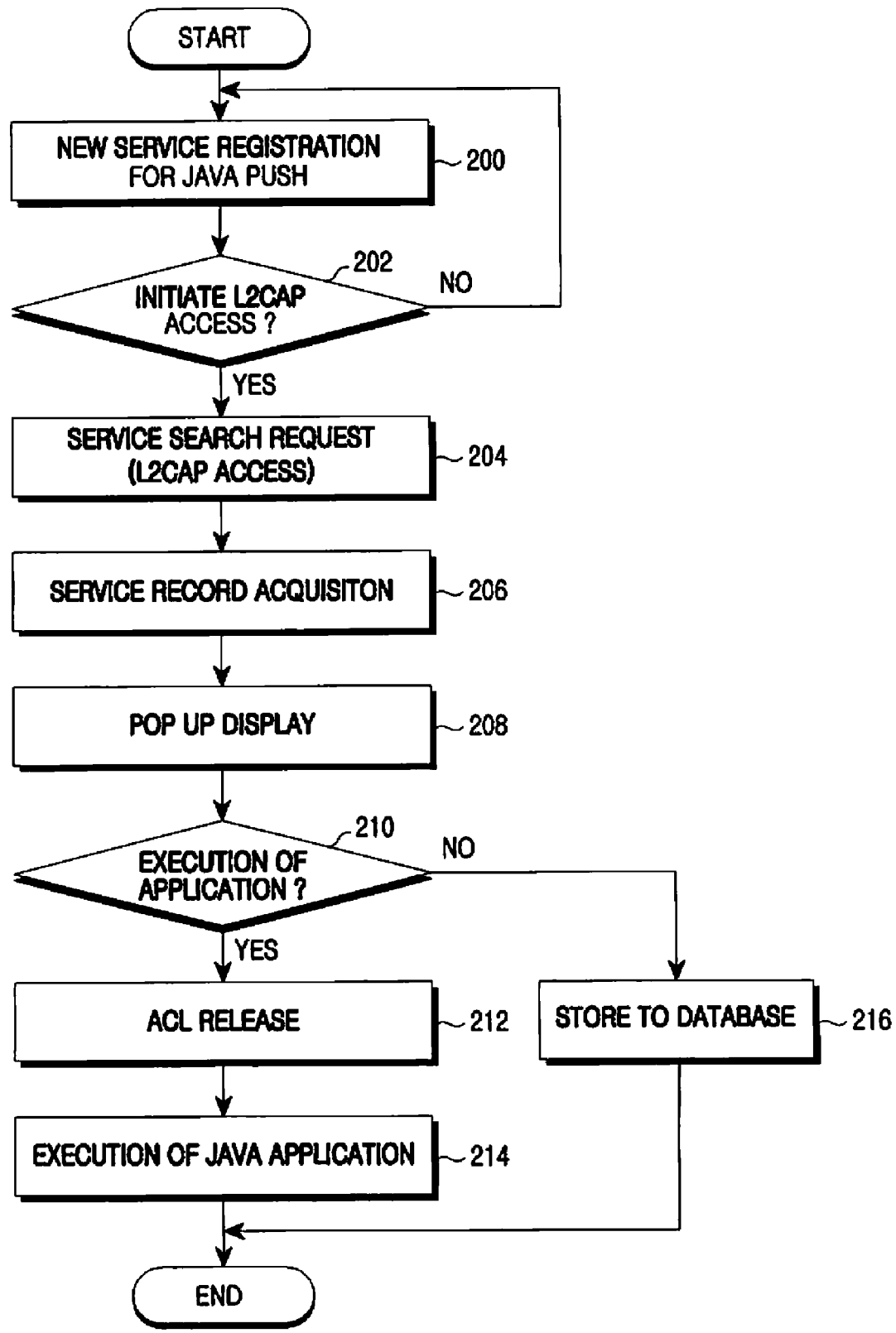
FIG. 2 illustrates a process for performing JAVA™ PUSH in a slave terminal using Bluetooth®(according to the present invention.

FIG. 2 illustrates a process for performing JAVA™ PUSH in a slave terminal using Bluetooth® communication according to the present invention.

Referring to FIG. 2, a slave terminal makes a new service registration for JAVA® PUSH in step 200. The new service registration includes a Service Class IDentifier (ServiceClassID), a protocol descriptor list (ProtocolDescriptorList) and a service name (ServiceName).

For example, the new service registration is listed below.
ServiceClassID(0x0001)=L2CAP(0x0001), ProtocolDescriptorList(0x0004)=L2CAP(0x0001) PSM=0x0001, ServiceName(0x0001)=JavaPush.

The slave terminal determines an initiation of L2CAP access from the maser terminal through the Bluetooth® communication in step 202, requests a service search in step 204 when it receives the access of L2CAP, and acquires a service record listed in Table 1 for the master terminal in step 206.

TABLE 1

Java|<ApplicationID>|<Sender>|<Content>|<Remote Address>

| Identifier | Description | Data Length | Data Type |
|---|---|---|---|
| Java | JAVA ® auto execution identifier "Java" | 4 bytes | ASCII |
| ApplicationID | Execution application ID | 12 bytes | ASCII |
| Sender | Name of sender | 10 bytes | UTF-8 |
| Content | Message displayed in a popup window | 30 bytes | UTF-8 |
| Remote Address | Address for identifying the Bluetooth devices | 16 bytes | ASCII |
| | Separator | 3 bytes | ASCII |

In Table 1, "Java" is a JAVA™ auto execution identifier, "ApplicationID" is a execution application ID, "Sender" is a name of a sender, "Remote Address" is a unique Bluetooth® address for each master device, and "|" is a separator for separating each object.

The slave terminal displays a message for requesting acceptance of an execution request of JAVA™ application from the master terminal using an identifier of the master terminal, in step 208.

When the slave terminal accepts the execution request, by a user, of JAVA™ application from the master terminal in step 210, the slave terminal releases an ACL (Asynchronous Connection Less) link by requesting ACL release in step 212 and executes a corresponding JAVA™ application in step 214.

When the slave terminal rejects the execution request of JAVA™ application from the master terminal in step 210, it proceeds to step 216 and stores a remote address of the master terminal to a database.

The remote address of the master terminal may be used to prevent executing the JAVA application without the procedure of step 208, when the master terminal retries the JAVA™ PUSH request using Bluetooth® communication.

According to implementation, the slave terminal stores the remote address for the master terminal once the JAVA™ PUSH is granted, and executes the JAVA™ application directly without performing step 208 when the granted master terminal retries the JAVA™ PUSH.

Thereafter, the process ends.

Figure 3:
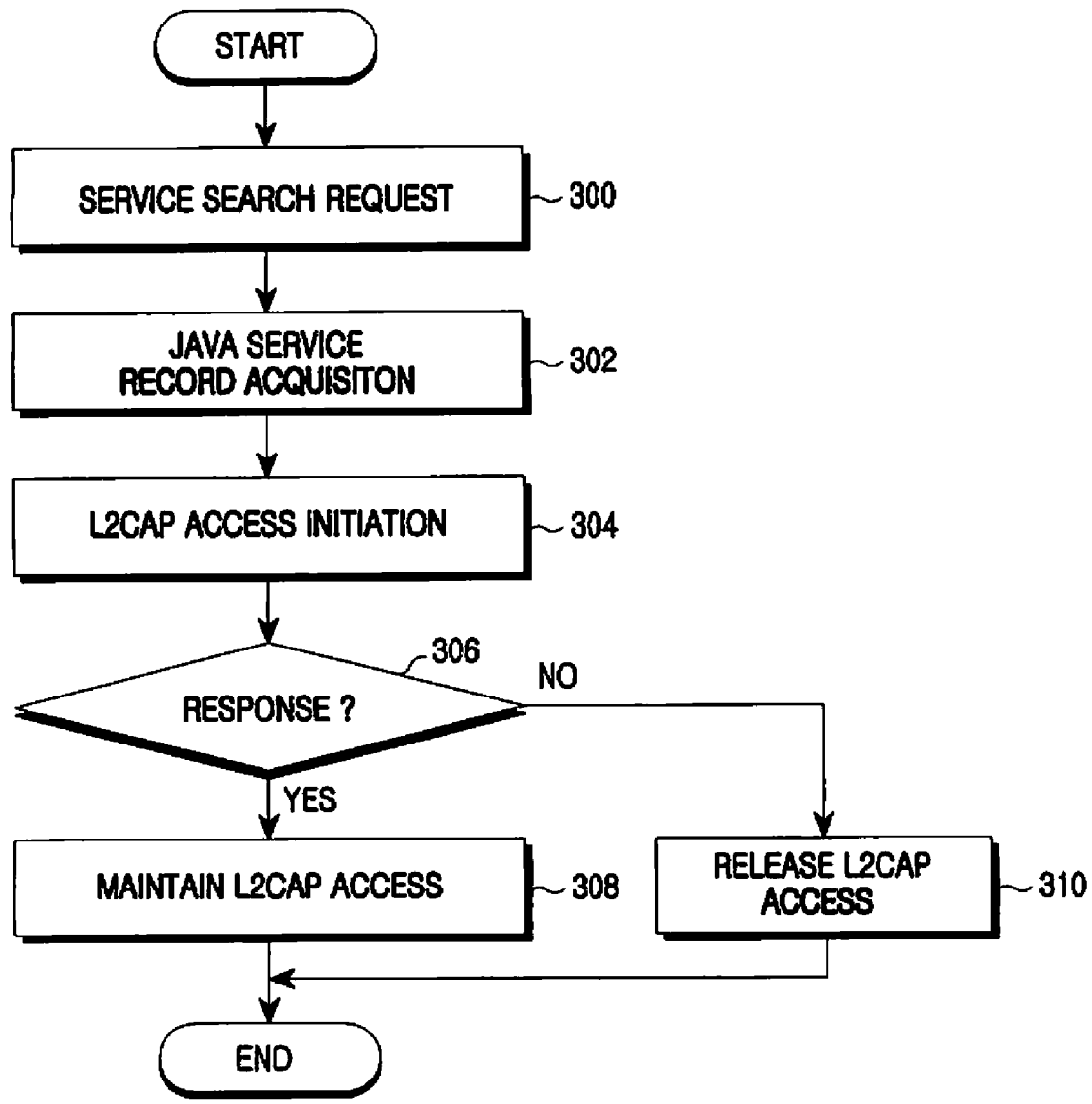
FIG. 3 illustrates a process for performing JAVA™ PUSH in a master terminal for Bluetooth® communication according to the present invention.

FIG. 3 illustrates a process for performing JAVA™ PUSH in a master terminal for Bluetooth® communication according to the present invention.

Referring to FIG. 3, a master terminal requests a service search for performing JAVA™ PUSH in step 300. The master terminal searches a JAVA™ service record to a corresponding slave terminal with a keyword of "L2CAP".

For example, the keyword may be "UUID(Universally Unique IDentifier)=0x0100(L2CAP), AttributeID=0x0100 (ServiceName)".

The master terminal acquires the JAVA™ service record through the search in step 302 and initiates an L2CAP access in step 304 when a reserved service name is identical to "JavaPush" which is a service name acquired from the JAVA™ service record. It is assumed that the reserved service name is pre-stored in the master terminal.

Steps 300 to 302 are repeated until the L2CAP access using an ACL link is established in step 304. The ACL link is used for packet exchange between the slave terminal and all operating master terminals with a specific period or asymmetrically. One ACL link is established between a master terminal and a slave terminal.

The master terminal determines whether there is a response from the slave terminal within a period of time in step 306 and proceeds to step 308 for maintaining the L2CAP access and executing JAVA™ application when there is the response.

The master terminal proceeds to step 310 for releasing the L2CAP access when there is no response from the slave terminal within the period of time.

Thereafter, the process ends.

Figure 4:
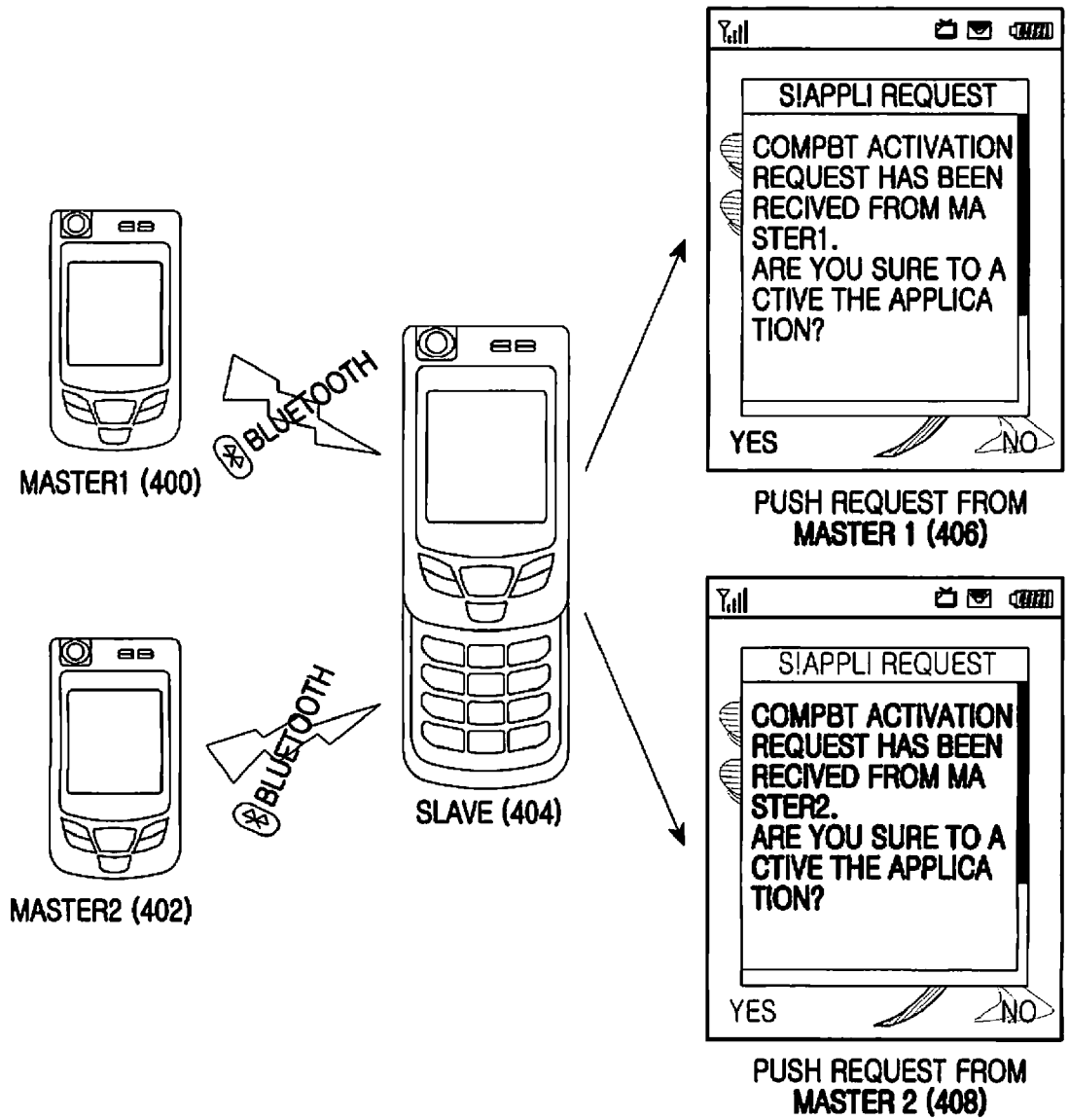
FIG. 4 illustrates an example of a Bluetooth® mobile communication terminal performing JAVA™ PUSH according to the present invention.

FIG. 4 illustrates a Bluetooth® mobile communication terminal performing JAVA™ PUSH according to the present invention.

Referring to FIG. 4, it is assumed that a slave terminal 404, a master terminal 1 400 and a master terminal 2 402 are running a JAVA™ application by using a JAVA™ PUSH.

The slave terminal 404 acquires L2CAP JAVA service records of the master terminal 1 400 and the master terminal 2 402 by performing the procedure of FIG. 2 as described above.

The slave terminal 404 acquires unique addresses, referred to above in Table 1, of the master terminal 1 400 and the master terminal 2 402 from the L2CAP JAVA™ service records, and displays to popup windows 406, 408 for indicating the terminals that access to Bluetooth® communication.

The slave terminal 404 determines whether to accept or reject Bluetooth® access from the master terminal 1 400 and the master terminal 2 402, and transmits the unique address of the slave terminal 404, as referred to above in Table 2, when the slave terminal 404 performs the procedure of JAVA™ PUSH as described in FIG. 3.

Figure 5:
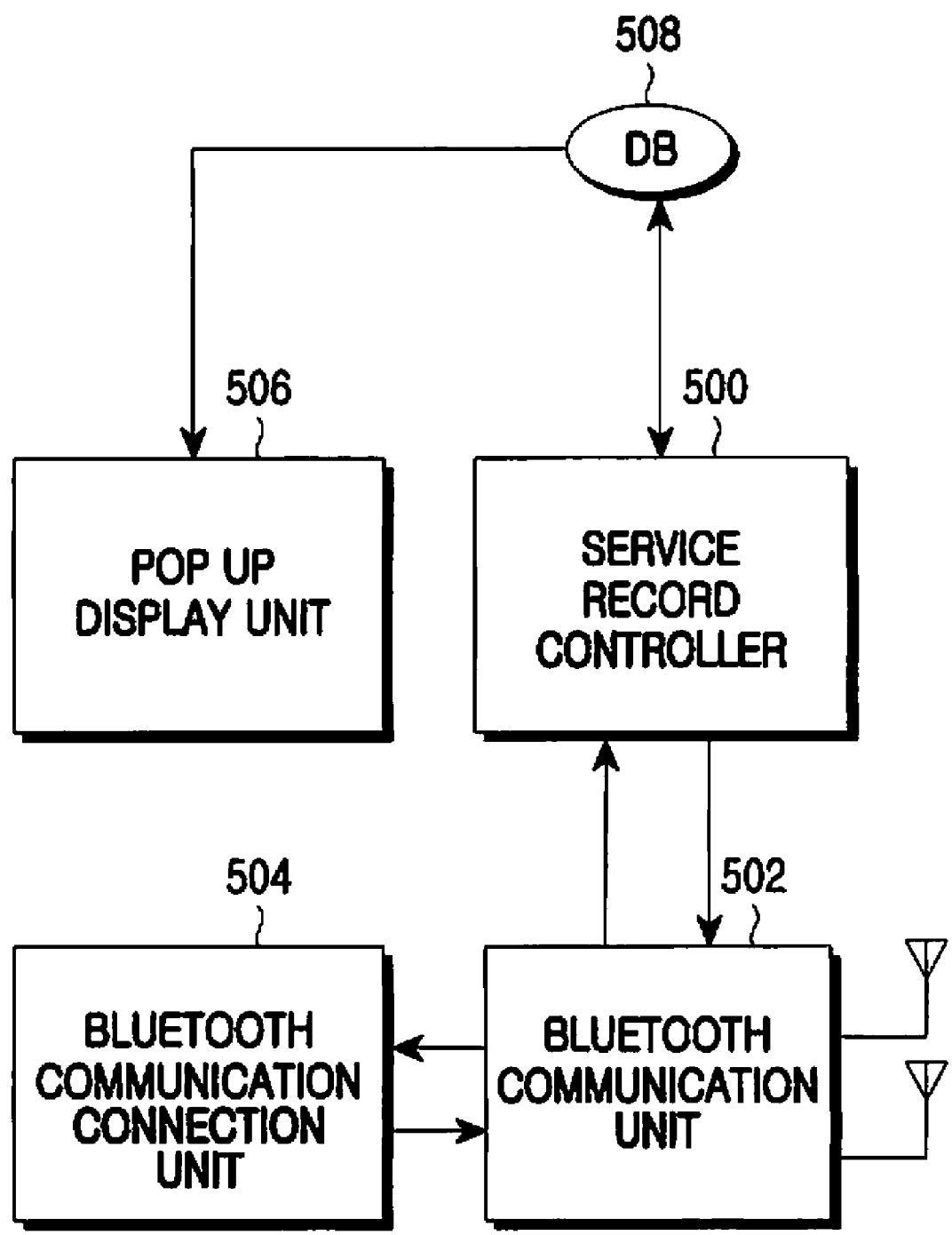
FIG. 5 illustrates an apparatus for performing JAVA™ PUSH using Bluetooth® communication according to the present invention.

FIG. 5 illustrates an apparatus for JAVA™ PUSH using Bluetooth® communication according to the present invention.

Referring to FIG. 5, an apparatus for JAVA™ PUSH includes a service record controller 500, a Bluetooth® communication unit 502, a Bluetooth® communication connection unit 504, a pop up display unit 506 and a database unit 508.

The apparatus may be attached to a personal computer, PDA and a mobile communication terminal as an additional apparatus according to the implementation.

The service record controller 500 requests a service search through an L2CAP access with other terminals and acquires information records for performing JAVA™ PUSH for the other terminals.

Also, the service record controller 500 determines whether to execute a corresponding application according to unique identification information of each popped up terminal. The corresponding application is executed after the ACL link is released.

When the service record controller 500 determines not to execute the corresponding application, the service record controller 500 stores remote addresses for the popped up terminals to the database unit 508 and the service record controller 500 makes a new service record registration for JAVA™.

The service record includes a Service Class IDentifier (ServiceClassID), a Protocol Descriptor List (ProtocolDescriptorList) and a Service Name (ServiceName).

For the master terminal, the service record controller 500 requests a service search for JAVA™ PUSH and acquires service records of terminals. The pop up display unit 506 determines the information records of terminals and displays each piece of unique identification information.

The unique identification information, referred to above in Table 1, includes JAVA® IDentifier (JAVA), JAVA™ Application ID (ApplicationID), a name of the sender, (Sender), displayed message (Content) and a unique Bluetooth® address (Remote Address).

The Bluetooth® communication connection unit 504 controls a link connection between a master terminal and a slave terminal during Bluetooth® communication and initiates an L2CAP access according to the information in the service record.

The Bluetooth® communication connection unit 504 releases the L2CAP access when there is a no response from the slave terminal and maintains the L2CAP access when there is a response from the slave terminal.

The Bluetooth® communication unit 502 configures and manages a link and a pico network, provides a reliable link to a upper layer using a Forward Error Correction (FEC) and a Automatic Repeat reQuest (ARQ), and controls an authentication and encryption.

The present invention has a benefit that the slave terminals may identify the JAVA™ PUSH request terminals by using added remote addresses of the JAVA® PUSH request terminals without any impact on the legacy protocol structure.

Also, the present invention has a benefit that the slave terminals are able to grant or reject the JAVA™ PUSH by identifying the JAVA™ PUSH request terminals.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An identifying method for a plurality of java push request terminals using Bluetooth® communication in a mobile communication terminal, the method comprising:
    acquiring information records about a plurality of terminals for performing java push by requesting a service search through a Logical Link Control and Adaption Protocol (L2CAP) connection between the mobile communication terminal and the plurality of java push request terminals, and
    displaying unique identification information of the plurality of java push request terminals by checking the information records of the plurality of java push request terminals.

2. The identifying method of claim 1, wherein the information records include a java identifier (JAVA), a java Application IDentifier (ApplicationID), a name of a Sender, (Sender), a displayed message (Content) and a unique Bluetooth® address (Remote Address).

3. The identifying method of claim 1, further comprising:
    determining whether to execute a corresponding application according to a unique identification of a popped up terminal.

4. The identifying method of claim 3, further comprising:
    executing the corresponding application after releasing an Asynchronous Connection Less (ACL) link when executing the corresponding application.

5. The identifying method of claim 3, further comprising:
    storing a remote address of a corresponding terminal, when the corresponding application is not executed.

6. The identifying method of claim 1, further comprising:
    registering a new java service record.

7. The identifying method of claim 6, wherein the new java service record includes a Service Class IDentifier (ServiceClassID), a Protocol Descriptor List (ProtocolDescriptorList) and a Service Name (ServiceName).

8. An identifying method for a plurality of java push request terminals using Bluetooth® communication in a mobile communication terminal, the method comprising:
    acquiring a service record of a slave terminal by requesting a service search for java push request; and,
    initiating a Logical Link Control and Adaption Protocol (L2CAP) connection by checking the service record.

9. The identifying method of claim 8, wherein the service record comprises a Service Class IDentifier (ServiceClassID), a Protocol Descriptor List (ProtocolDescriptorList) and a Service Name (ServiceName).

10. The identifying method of claim 9, further comprising:
    refraining from initiating the L2CAP connection when the ServiceClassID and the ServiceName do not satisfy a search condition.

11. The identifying method of claim 8, further comprising:
    releasing the L2CAP connection when there is no response to the request for the service search from the slave terminal.

12. The identifying method of claim 8, further comprising:
    maintaining the L2CAP connection when there is a response to the request for the service search from the slave terminal.

13. An identifying apparatus for a plurality of java push request terminals using Bluetooth® in a mobile communication terminal, the apparatus comprising:
    a service record controller for acquiring information records about a plurality of terminals for performing java push by requesting a service search through a Logical Link Control and Adaption Protocol (L2CAP) connection between the mobile communication terminal and the plurality of java push request terminals; and,
    a pop up displaying unit for displaying unique identification information of the plurality of java push request terminals by checking the information records of the plurality of java push request terminals.

14. The identifying apparatus of claim 13, wherein the information records include a java IDentifier (JAVA), a java application IDentifier (ApplicationID), a name of a sender, (Sender), a displayed message (Content), and a unique Bluetooth® address (Remote Address).

15. The identifying apparatus of claim 13, wherein the service record controller determines whether to execute a corresponding application according to a unique identification of a popped up terminal.

16. The identifying apparatus of claim 15, wherein the service record controller executes the corresponding application after releasing an Asynchronous Connection Less (ACL) link when executing the corresponding application.

17. The identifying apparatus of claim 15, wherein the service record controller stores a remote address of a corresponding terminal when the corresponding application is not executed.

18. The identifying apparatus of claim 13, wherein the service record controller registers a new java service record.

19. The identifying apparatus of claim 18, wherein the new java service record includes a Service Class IDentifier (ServiceClassID), a Protocol Descriptor List (ProtocolDescriptorList) and a Service Name (ServiceName).

20. An identifying apparatus for a plurality of java push request terminals using Bluetooth® in a mobile communication terminal, the apparatus comprising:
    a service record controller for acquiring a service record of a slave terminal by requesting a service search for java push request; and
    a Bluetooth® connection unit for initiating a Logical Link Control and Adaption Protocol (L2CAP) connection by checking the service record.

21. The identifying apparatus of claim 20, wherein the service record includes a Service Class IDentifier (ServiceClassID), a Protocol Descriptor List (ProtocolDescriptorList) and a Service Name (ServiceName).

22. The identifying apparatus of claim 20, wherein the service record controller does not initiate an L2CAP connection when the ServiceClassID and the ServiceName do not satisfy a search condition.

23. The identifying apparatus of claim 20, wherein the service record controller releases the L2CAP connection when there is no response to the request for the service search from the slave terminal.

24. The identifying apparatus of claim 20, wherein the service record controller maintains the L2CAP connection when there is a response to the request for the service search from the slave terminal.

25. A non-transitory computer-readable recording medium having recorded thereon a program for a plurality of java push request terminals using Bluetooth® communication in a mobile communication terminal, comprising:
- a first code segment, for acquiring information records about a plurality of terminals for performing java push by requesting a service search through a Logical Link Control and Adaption Protocol (L2CAP) connection between the mobile communication terminal and the plurality of java push request terminals, and
- a second code segment, for displaying unique identification information of the plurality of java push request terminals by checking the information records of the plurality of java push request terminals.

26. A non-transitory computer-readable recording medium having recorded thereon a program for a plurality of java push request terminals using Bluetooth® communication in a mobile communication terminal, comprising:
- a first code segment, for acquiring a service record of a slave terminal by requesting a service search for java push request; and,
- a second code segment, for initiating a Logical Link Control and Adaption Protocol (L2CAP) connection by checking the service record.

* * * * *